Sept. 19, 1967 W. B. CONRAD 3,342,081
REMOTE CONTROL ASSEMBLY
Filed July 9, 1965 2 Sheets-Sheet 1
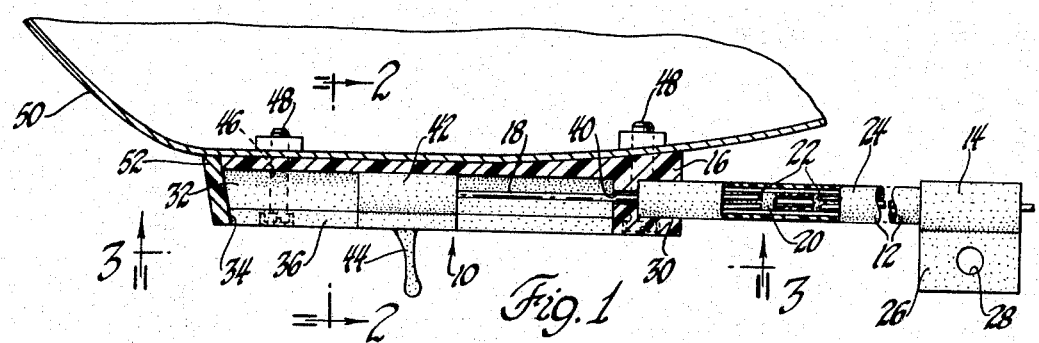
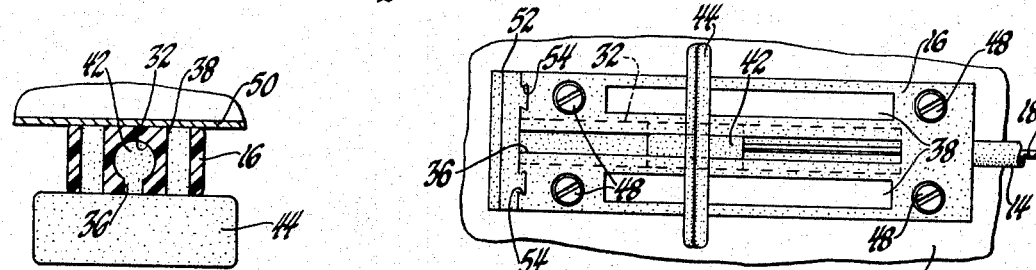
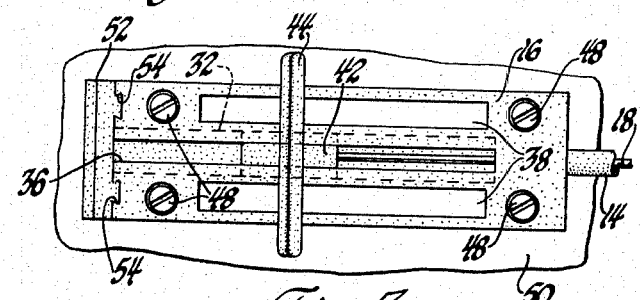
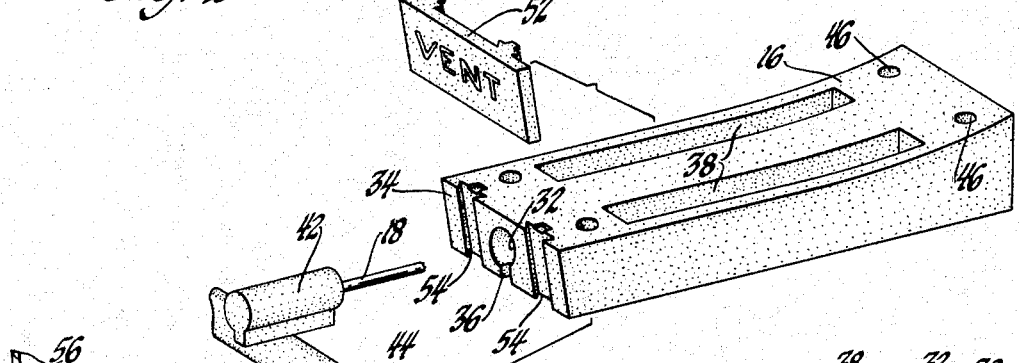
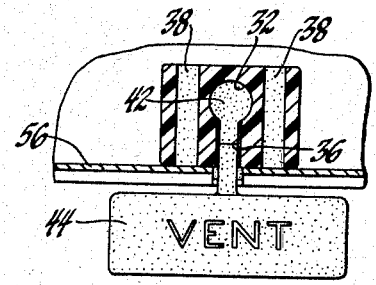
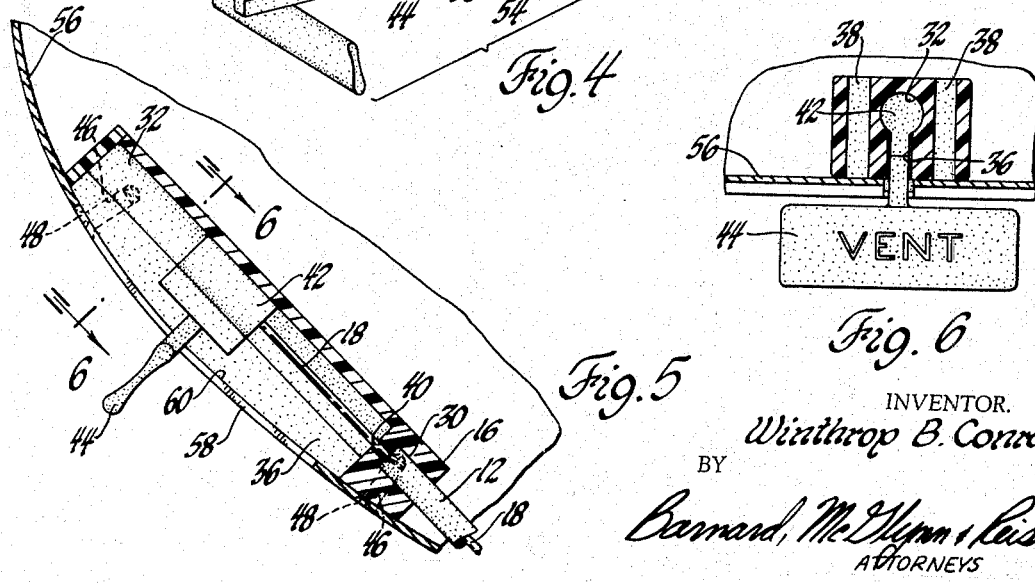
INVENTOR.
Winthrop B. Conrad
BY
Barnard, McGlynn & Reising
ATTORNEYS Sept. 19, 1967  W. B. CONRAD  3,342,081
REMOTE CONTROL ASSEMBLY
Filed July 9, 1965  2 Sheets-Sheet 2
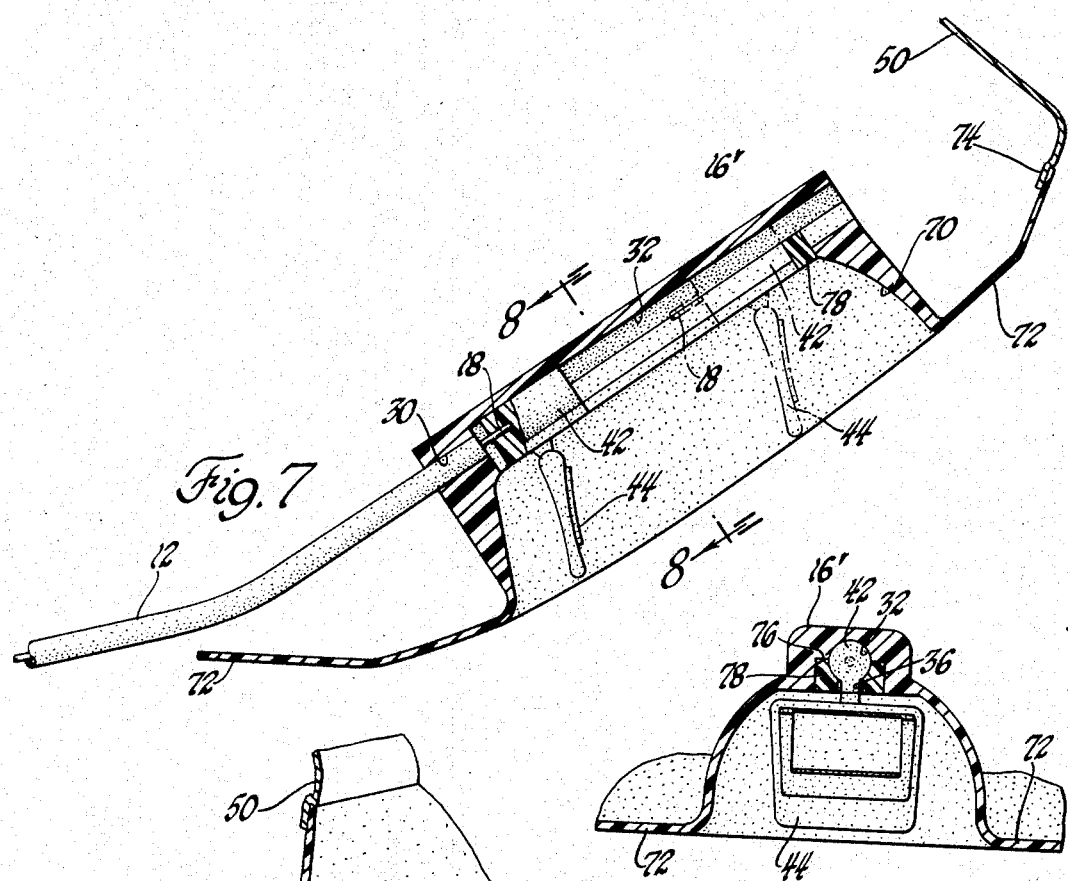
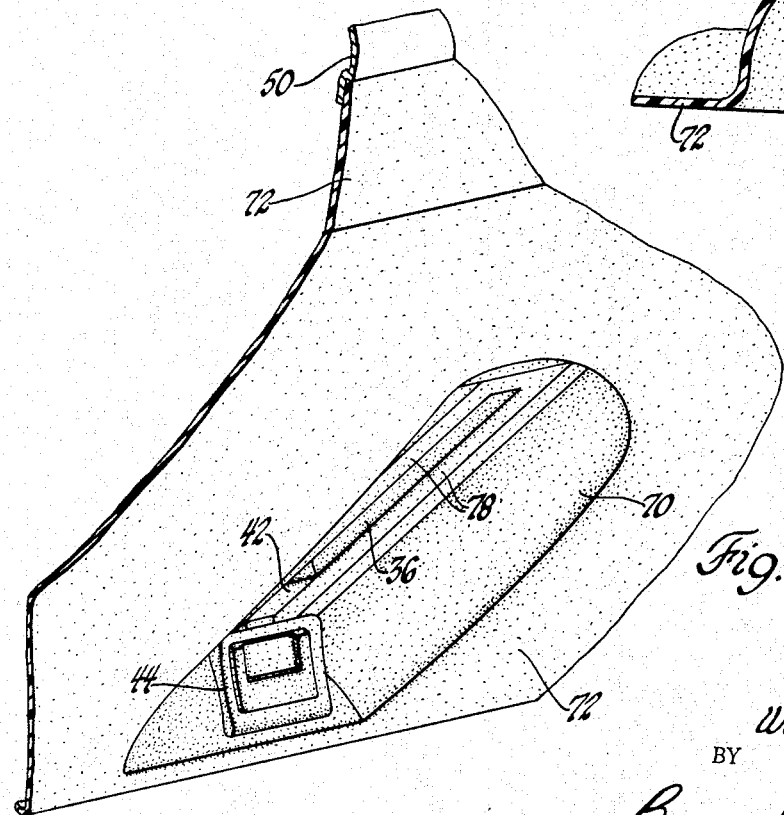
INVENTOR.
Winthrop B. Conrad
BY
Barnard, McEwynn & Leising
ATTORNEYS United States Patent Office 3,342,081
Patented Sept. 19, 1967

3,342,081
REMOTE CONTROL ASSEMBLY
Winthrop B. Conrad, Franklin, Mich., assignor to Teleflex Incorporated, North Wales, Pa., a corporation of Delaware
Filed July 9, 1965, Ser. No. 473,564
22 Claims. (Cl. 74—501)

ABSTRACT OF THE DISCLOSURE

A remote control assembly having a fitting attached to a flexible conduit movably supporting a motion transmitting core element which is attached at one end thereof to a slider member operatively connected to the fitting for sliding movement therealong and which slider member has a portion thereof extending from the fitting in a direction substantially transverse to the motion transmitting core element.

This application is a continuation-in-part of application Ser. No. 456,373, filed May 17, 1965, now abandoned, and assigned to the assignee of the instant invention.

Remote control assemblies of the type to which the instant invention pertains are typically used in marine, aircraft, and automotive installations. Such an assembly typically includes a flexible conduit for supporting a movable core element which is utilized as a control member and includes one or more fittings secured to the conduit to attach the conduit to a support structure. Remote control assemblies of the instant type are frequently utilized in automobiles to control such things as vents and heaters. The fittings in such an installation are secured to the support structure of the automobile and the movable core element is moved within the conduit to control the heater, vent, or the like.

A typical remote control assembly heretofore utilized has an end fitting attached to one end of the conduit so that the motion transmitting core element extends out of the conduit and through the fitting to a knob, or the like, which may be manually grasped to move the core element within the conduit and into and out of the end fitting. Such an end fitting is frequently adapted to be secured to the bottom of the instrument panel or dashboard in an automobile such that it hangs downward therefrom a sufficient distance for allowing ample space for manually grasping the knob attached to the end of the motion transmitting core element. In such an installation, most of the end fitting is visible so that the use of such remote control assemblies prevents the design of a clean dashboard or instrument panel area in automobiles, or other vehicles.

Another manner in which such remote control assemblies have heretofore been utilized in an effort to hide the end fitting thereof from view is exemplified by the defrost, vent, heater, and like controls in some automobiles where, in order to facilitate the design of a clean dashboard or instrument panel so that only the manually accessible portion of the remote control assembly is observable, it has been necessary to utilize expensive and space consuming mechanisms. Such mechanisms typically utilize a frame which is secured behind the dashboard or instrument panel with one or more lever arms pivotally attached to the frame and extending through slots in the instrument panel or dashboard. One end of the conduit is normally attached to the frame such that the movable core element extends from the conduit and is attached to one of the lever arms so that the end of the lever arm extending through the dashboard may be manually moved so as to pivot the lever arm to slide the movable core element within the conduit to control a heater, vent, or the like. Due to the limitations of the prior art remote control assemblies, this lever arm mechanism has heretofore been the only suitable manner in which to move the core element of a remote control assembly when the manually accessible control members are disposed on the face, or upwardly slanting portion, of the instrument panel or dashboard of an automobile. That is to say, when the manually accessible control members, such as for a vent, are disposed on the dashboard or instrument panel so that they are actuated by pushing them generally up or down so that the movement thereof is generally parallel to the movement of the motion transmitting core element, the only suitable means heretofore known in the prior art to move the motion transmitting core element of a remote control assembly disposed in such a manner is a lever arm pivotally mounted behind the dashboard or instrument panel and extending through the dashboard or instrument panel.

Furthermore, the structures which have heretofore been utilized in remote control assemblies are not suitable for recessing the manually graspable control member of the remote control assembly to provide a safety feature. It is desirable to remove as many projections as possible from the instrument panel area so that in the event of an accident people riding in the front seat of the automobile will not be thrown against such projections which could cause serious injuries. It is, therefore, desirable to recess control members of remote control assemblies. It is impossible to recess the remote control assembly of the type having a knob on the end of the movable control element since the knob must be pulled out of and pushed into the instrument panel, therefore, necessitating that it project from the instrument panel when pulled out. When the lever assembly is utilized in a remote control assembly, the manually graspable end of the lever may be recessed from the dashboard, but this further complicates the space problem in that the recess requires space which is added to the already great volume of space needed for the lever mechanism assembly and therefore has not proven satisfactory.

Accordingly, it is an object and feature of this invention to provide a remote control assembly suitable for use in automobiles, and the like, to control such things as heaters and vents and which remote control assembly may have one end thereof mounted in the dashboard or instrument panel area such that it is readily accessible for manual actuation thereof but is not observable.

Another object and feature of this invention is to provide a remote control assembly suitable for use in automobiles including a manually graspable slider member which is recessed and which requires a minimum amount of space.

Another object and feature of this invention is to provide a remote control assembly including an end fitting enclosing a recessed manually graspable slider member and adapted to form a portion of the instrument panel in an automobile.

Another object and feature of this invention is to provide a remote control assembly suitable for use in automobiles which assembly has a fitting and a slider member attached to one end of the motion transmitting core element of the assembly and slidably disposed on the fitting whereby the fitting may be attached to the inside of the instrument panel of an automobile so that a portion of the slider member extends transverse to the motion transmitting core element and through the instrument panel so as to be accessible for manual actuation of the control assembly.

In general, these and other objects and features of this invention are attained by a remote control assembly including a fitting secured at a first end thereof to one end of a conduit which slidably supports a motion transmitting core element. The fitting has a slideway which extends along the fitting and one end of the motion transmitting core element extends from the conduit and into the slideway. The fitting also has a slot extending therealong which is coextensive with the slideway for providing access to the slideway from the exterior of the fitting. A slider member is attached to the motion transmitting core element and is slidably disposed in the slideway and is formed to substantially conform to the configuration of the slideway and the slot, and includes a portion which extends away from the fitting in a direction substantially transverse to the motion transmitting core element and the slideway. The fitting includes means such as holes, or the like, for receiving fastening devices so that the fitting may be attached to the instrument panel of an automobile, either on the bottom thereof, or on the inside thereof so that the portion of the slider member extending away from the fitting may extend through the instrument panel or dashboard, to be accessible for manual movement of the slider member along the slideway which in turn moves the motion transmitting core element within the conduit. Alternatively, the fitting may be an integral member forming part of the dashboard or instrument panel and including a cavity so that the slider member is recessed from the face of the dashboard or instrument panel.

Other objects and attendant advantages of the present invention will be readily appreciated as the same becomes better understood by reference to the following detailed description when considered in connection with the accompanying drawings wherein:

FIGURE 1 is a fragmentary cross-sectional view of a preferred embodiment of the remote control assembly of the instant invention;

FIGURE 2 is a fragmentary cross-sectional view taken substantially along line 2—2 of FIGURE 1;

FIGURE 3 is a fragmentary cross-sectional view taken substantially along line 3—3 of FIGURE 1;

FIGURE 4 is an exploded isometric view of the preferred embodiment illustrated in FIGURES 1 through 3;

FIGURE 5 is a fragmentary cross-sectional view of another preferred embodiment of the present invention;

FIGURE 6 is a fragmentary cross-sectional view taken substantially along line 6—6 of FIGURE 5;

FIGURE 7 is a fragmentary cross-sectional view of another preferred embodiment of the present invention;

FIGURE 8 is a fragmentary cross-sectional view taken substantially along line 8—8 of FIGURE 7; and FIGURE 9 is a perspective view of the embodiment illustrated in FIGURES 7 and 8.

Referring now to the drawings, wherein like reference numerals indicate like or corresponding parts throughout the several views, there is shown, generally at 10, a preferred embodiment of the remote control assembly of the instant invention which includes a flexible conduit 12, a first fitting 14, a second fitting 16, and a motion transmitting core element 18.

The flexible conduit 12 comprises an inner tubular member 20 with a plurality of spaced filaments 22 helically wrapped about the inner tubular member 20 with a relatively long lead. The filaments 22 may be of any appropriate material, such as wire, fiberglass, or an organic polymeric material. A casing 24 is disposed about the filaments 22 and the inner tubular member 20.

The fitting 14 is secured at one end of the conduit 12 and is adapted by the flange 26 and the hole 28 to be attached to a support structure by a suitable fastening means (not shown). The fitting 14 may be of any appropriate material and secured to the conduit 12 by a mechanical grip; however, it is preferable that the fitting 14 be made of plastic molded about the conduit 12 so as to be intimately bonded with the outer casing 24 of the conduit 12.

The motion transmitting core element 18 is movably supported within the inner tubular member 20 of the conduit 12 and is adapted at one end to be attached to an element to be controlled (not shown) and extends at the other end into the fitting 16.

The conduit 12 is secured to one end of the fitting 16 at 30. The fitting 16 is preferably made of plastic and is molded about the end of the conduit 12 so as to form a bond between the fitting 16 and the conduit 12.

The fitting 16 includes a slideway 32 which extends from one end 34 of the fitting 16 a predetermined distance along the fitting 16. The slideway 32 is illustrated as being substantially circular, however, any appropriate configuration may be utilized. A slot 36 extends along the fitting 16 and is coextensive with the slideway 32 and provides access to the slideway 32 from the exterior of the fitting 16. The fitting 16 also includes cavities 38 which are formed during the molding of the fitting 16 so as to reduce the weight of the fitting and allow the fitting to be made of less material than a fitting formed without such cavities.

One end of the motion transmitting core element 18 extends from the conduit through a passage 40 in the end fitting 16 and into the slideway 32. A slider member 42 is attached to the end of the motion transmitting core element 18 and is slidably disposed in the slideway 32. The slider member 42 is formed so as to substantially conform the cross-sectional configuration of the slideway 32 and the slot 36 and includes a portion 44 which extends out of the slot 36 away from the fitting 16 in a direction substantially transverse the slideway 32 and the motion transmitting core element 18. The portion 44 which extends from the slider member 42 may take any appropriate form but is illustrated in the drawings as an elongated member which may be manually grasped so as to slide the slider member 42 along the slideway 32 and the slot 36.

The fitting 16 also includes means for attaching the fitting to a support structure comprising the holes 46 for receiving fastening means such as the bolts 48.

The embodiment illustrated in FIGURES 1 through 4 may be attached by the bolts 48 to the bottom or the underneath of a dashboard or instrument panel 50 of an automobile, or the like. This embodiment may also utilize a name plate 52 which is secured to the end 34 of the fitting 16 by the dovetail slots 54. By disposing the fitting 16 beneath an instrument panel 50 as illustrated in FIGURES 1 through 4, the only portion of the fitting 16 which may be observed is the name plate 52 which has lettering thereon to indicate the name of the particular element to be controlled. This particular end fitting, therefore, alleviates the necessity of utilizing the unsightly fittings of the type heretofore utilized wherein the motion transmitting core element extends entirely through the fitting and is attached to a knob which may be moved toward and away from the fitting to move the motion transmitting core element.

Referring now more particularly to FIGURES 5 and 6, the end fitting 16 is adapted for attachment to a wall 56 such as a dashboard, instrument panel, or any other appropriate bulkhead, so that the portion 44 of the slider member 42 extends through a slot 58 in the wall so that the entire remote control assembly is hidden except for the manually graspable portion 44. As is evident from FIGURE 5, one face or side 60 of the fitting 16 may be formed in the molding process to mate with a curved wall 56, such as an instrument panel or dashboard of an automobile. Also, as is illustrated in FIGURE 6, the portion 44 of the slider member 42 may also serve as a name tag.

Referring now more particularly to FIGURES 7 through 9, there is shown at fitting 16' formed to include the recess or cavity 70 and the wall means 72 projecting from the extremities of the recess 70. The fitting 16' shown in FIGURES 7 through 9 is preferably molded of a plastic material to include the recess 70 and the wall means 72 such that the fitting forms a part of the instrument panel in an automobile. As is more clearly shown in FIGURE 7, the wall means 72 is attached at 74 to the remaining portion of an instrument panel 50, thus, the manually graspable portion 44 of the slider member 42 in the fitting 16' shown in FIGURES 7 through 9 does not project from the surface of the instrument panel, hence alleviates the possibility of injury to an individual in the event the individual is thrown against the instrument panel.

As is more clearly illustrated in FIGURE 8, the fitting 16' shown in FIGURES 7 through 9 illustrates an alternative manner in which to form the slideway 32 and slot 36. As shown in FIGURE 8, the fitting 16' is molded with a cavity 76 such that the inserts 78 may be secured in the cavity 76 to form the slideway 32 and the slot 36.

It is also to be understood that a larger integral assembly may be molded such that more than one conduit is attached thereto with various slider members disposed adjacent a number of respective recesses in the integrally formed member. Such a member, which includes a plurality of recesses in which respective slider members are movable, may form a part of the instrument panel of an automobile.

The slider member 42 and the extending portion 44 may be of two different parts so that the elongated portion 44 is attached to the slider member 42 at a point where the slider member 42 extends out of the slot 36. The slider member 42 is preferably made out of plastic or an organic polymeric material, however, it may also be made of other materials, such as metal.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A remote control assembly comprising: a conduit; a fitting attached to said conduit; a slider member slidably connected to said fitting in bearing engagement with the latter for sliding movement along a portion of and only between the ends of said fitting; said bearing engagement between said fitting and said slider member preventing any movement of the latter relative to said fitting other than said sliding movement; said slider member having a portion thereof extending away from said fitting at an angle to the direction of the sliding movement thereof; and a motion transmitting core element movably disposed in said conduit and attached to said slider member.

2. A remote control assembly comprising: a conduit; a fitting attached to said conduit; a slider member slidably connected to said fitting for sliding movement along a portion and between the ends of said fitting; said slider member having a portion thereof extending away from said fitting at an angle to the direction of the sliding movement thereof; and a motion transmitting core element movably disposed in said conduit and attached to said slider member; said fitting being adapted for attachment to a wall so that said portion of said slider member extending away from said fitting may extend through such a wall.

3. A remote control assembly comprising: a conduit; a fitting attached to said conduit; a slider member slidably connected to said fitting for sliding movement along a portion and between the ends of said fitting; said slider member having a portion thereof extending at a transverse angle to the direction of sliding movement thereof; and a motion transmitting core element movably disposed in said conduit and attached to said slider member; said fitting having a recess therein in which said portion of said slider member moves.

4. A remote control assembly comprising: a conduit; a fitting secured at a first end thereof to one end of said conduit; said fitting having a slideway extending therealong and including portions defining ends of said slideway which are spaced from the adjacent ends of the fitting; a slider member retained in bearing engagement with said slideway for sliding motion in said slideway only between the ends of said slideway and having a portion thereof disposed exteriorly of said fitting and extending away from said fitting in a direction substantially transverse to said slideway; said slideway coacting with said slider member to prevent any movement of the latter relative to said fitting other than said sliding motion; and a motion transmitting core element movably disposed in said conduit attached to said slider member.

5. A remote control assembly as set forth in claim 4 including a plate secured to the second end of said fitting.

6. A remote control assembly comprising: a flexible conduit; a fitting secured at a first end thereof to one end of said conduit; said fitting having a slideway extending therealong; a slider member retained for sliding motion in said slideway between ends of said fitting and having a portion thereof extending away from said fitting in a direction substantially transverse to said slideway; and a motion transmitting core element movably disposed in said conduit and having one end thereof attached to said slider member; said fitting being adapted for attachment to a wall so that said portion of said slider member extending away from said fitting may extend through such a wall.

7. A remote control assembly comprising: a flexible conduit; a fitting secured to said conduit; said fitting having a slideway extending therealong; a motion transmitting core element movably disposed in said conduit; said motion transmitting core element extending from said conduit and into said slideway; said fitting having a slot therealong which is coextensive with a portion of said slideway for providing access to said slideway from the exterior of said fitting; a slider member attached to said motion transmitting core element and slidably disposed in said slideway for movement between the ends of said slot; said slider member being formed to substantially conform to the configuration of said slideway and said slot and includes a portion extending away from said fitting in a direction substantially transverse to said slideway.

8. A remote control assembly as set forth in claim 7 including a plate secured to said fitting.

9. A remote control assembly as set forth in claim 7 wherein said fitting is adapted for attachment to a wall so that said portion of said slider member extending away from said fitting may extend through such a wall.

10. A remote control assembly as set forth in claim 7 wherein said fitting includes a recess coextensive with said slot and said slideway, and said portion of said slider member is disposed for movement in said recess.

11. A remote control assembly comprising: a flexible conduit; a fitting secured at a first end thereof to a first end of said conduit; said fitting having a slideway extending from the second end thereof a predetermined distance thereinto; a motion transmitting core element movably disposed in said conduit and having a first end thereof extending from the second end of said conduit and adapted for attachment to a member to be controlled; said motion transmitting core element having a second end thereof extending from said first end of said conduit and into said slideway; said fitting having a slot therealong which is coextensive with a portion of said slideway for providing access to said slideway from the exterior of said fitting; a slider member attached to said motion transmitting core element and slidably disposed in said slideway; said slider member being formed to substantially conform to the configuration of said slideway and said slot and includes a portion disposed exteriorly of said fitting and extending away from said fitting in a direction substantially transverse to said slideway so that the movement of said slider member is limited by said slot to movement solely between said ends of said fitting; and said fitting including means for attaching said fitting to a support structure.

12. A remote control assembly as set forth in claim 11 including a name plate secured to the second end of said fitting.

13. A remote control assembly as set forth in claim 11 wherein said second fitting is adapted for attachment to a wall so that said portion of said slider member extending away from said second fitting may extend through such a wall.

14. A remote control assembly comprising: a conduit; a fitting secured to one end of said conduit; said fitting having a slideway extending therealong; a motion transmitting core element movably disposed in said conduit and having a first end thereof extending from said conduit and into said slideway; said fitting having a slot therealong which is coextensive with a portion of said slideway for providing access to said slideway; a slider member attached to said motion transmitting core element and slidably disposed in said slideway; said slider member formed to substantially conform to the configuration of said slideway and said slot and includes a portion extending from said slot; and said fitting including a recess therein which is substantially coextensive with said slot so that said portion of said slider member extending from said slot is movable in said recess.

15. A remote control assembly as set forth in claim 14 wherein said fitting includes wall means extending from the extremities of said recess so that said fitting is adapted to form part of an instrument panel and the like.

16. A remote control assembly comprising: a flexible conduit; a first fitting secured to a first end of said conduit; a motion transmitting core element movably disposed in said conduit and having a first end thereof extending from said first fitting and adapted for attachment to a member to be controlled; a plastic second fitting secured at a first end thereof to the second end of said conduit; said second fitting having a slideway extending from the second end thereof a predetermined distance thereinto; said second fitting having a slot therealong which is coextensive with a portion of said slideway and provides access to said slideway from the exterior of said second fitting; said motion transmitting core element having a second end thereof extending from said second end of said conduit and into said slideway; and a plastic slider member attached to said second end of said motion transmitting core element and slidably disposed in said slideway for movement between the ends of said slot; said slider member being formed to substantially conform to the configuration of said slideway and said slot and includes a portion extending away from said second fitting in a direction substantially transverse said slideway; said second fitting having holes therein to receive fastening means for attaching said second fitting to a support structure.

17. A remote control assembly as set forth in claim 16 including a name plate secured to said second end of said second fitting.

18. A remote control assembly as set forth in claim 16 wherein said second fitting is adapted for attachment to a wall so that said portion of said slider member extending away from said second fitting may extend through such a wall.

19. A remote control assembly comprising: a flexible conduit including, an inner tubular member, a plurality of filaments helically wrapped about said inner tubular member with a relatively long lead, a casing surrounding said filaments; a first fitting secured to a first end of said conduit; a motion transmitting core element movably disposed in said conduit and having a first end thereof extending from said first fitting and adapted for attachment to a member to be controlled; a plastic second fitting secured at a first end thereof to the second end of said conduit; said second fitting having a slideway extending from the second end thereof a predetermined distance thereinto; said second fitting having a slot therealong which is coextensive with a portion of said slideway and provides access to said slideway from the exterior of said second fitting; said motion transmitting core element having a second end thereof extending from said second end of said conduit and into said slideway; and a plastic slider member attached to said second end of said motion transmitting core element and slidably disposed in said slideway for movement between the ends of said slot; said slider member being formed to substantially conform to the configuration of said slideway and said slot and includes a portion extending away from said second fitting in a direction substantially transverse said slideway; said second fitting having holes therein to receive fastening means for attaching said second fitting to a support structure.

20. A remote control assembly as set forth in claim 19 including a name plate secured to said second end of said second fitting.

21. A remote control assembly comprising: a flexible conduit including, an inner tubular member, a plurality of filaments helically wrapped about said inner tubular member with a relatively long lead, a casing surrounding said filaments; a first fitting secured to a first end of said conduit; a motion transmitting core element movably disposed in said conduit and having a first end thereof extending from said first fitting and adapted for attachment to a member to be controlled; a plastic second fitting secured at a first end thereof to the second end of said conduit; said second fitting having a slideway extending from the second end thereof a predetermined distance thereinto; said second fitting having a slot therealong which is coextensive with a portion of said slideway and provides access to said slideway from the exterior of said second fitting; said motion transmitting core element having a second end thereof extending from said second end of said conduit and into said slideway; and a plastic slider member attached to said second end of said motion transmitting core element and slidably disposed in said slideway for movement between the ends of said slot; said slider member being formed to substantially conform to the configuration of said slideway and said slot and includes a portion extending away from said second fitting in a direction substantially transverse said slideway; said second fitting being adapted for attachment to a wall so that said portion of said slider member extending away from said second fitting may extend through such a wall.

22. A remote control assembly comprising: a flexible conduit including, an inner tubular member, a plurality of filaments helically wrapped about said inner tubular member with a relatively long lead, a casing surrounding said filaments; a first fitting secured to a first end of said conduit; a motion transmitting core element movably disposed in said conduit and having a first end thereof extending from said first fitting and adapted for attachment to a member to be controlled; a plastic second fitting secured at a first end thereof to the second end of said conduit; said second fitting having a slideway extending from the second end thereof a predetermined distance thereinto; said second fitting having a slot therealong which is coextensive with a portion of said slideway and provides access to said slideway from the exterior of said second fitting; said motion transmitting core element having a second end thereof extending from said second end of said conduit and into said slideway; and a plastic slider member attached to said second end of said motion transmitting core element and slidably disposed in said slideway for movement between the ends of said slot; said slider member being formed to substantially conform to the configuration of said slideway and said slot and includes a portion extending away from said second fitting in a direction substantially transverse said slideway; said second fitting including a recess in which said portion of said slider member is movable; and wall means extending from said recess and adapted to form part of an instrument panel and the like whereby said slider member is prevented from projecting from such an instrument panel.

References Cited

UNITED STATES PATENTS

| 1,897,216 | 2/1933 | Schmidt | 74—501 |
| 2,114,359 | 4/1938 | Selje | 74—502 |
| 3,063,303 | 11/1962 | Cadwallader | 74—501 |
| 3,182,162 | 5/1965 | Gelfand et al. | 180—90 |
| 3,263,948 | 8/1966 | Conrad | 74—501 |

FOREIGN PATENTS 10,661  1911  Great Britain.

FRED C. MATTERN, Jr., *Primary Examiner.*

C. F. GREEN, *Assistant Examiner.*